United States Patent [19]

Morikane

[11] Patent Number: 4,985,654
[45] Date of Patent: Jan. 15, 1991

[54] BRUSH DEVICE FOR A MOTOR
[75] Inventor: Hiroyuki Morikane, Himeji, Japan
[73] Assignee: Mitsubishi Denki Kabushiki Kaisha, Tokyo, Japan
[21] Appl. No.: 424,045
[22] Filed: Oct. 19, 1989
[30] Foreign Application Priority Data Nov. 26, 1988 [JP] Japan .................. 63-154022[U]

[51] Int. Cl.⁵ ............................................. H02K 13/00
[52] U.S. Cl. .................................. 310/249; 310/71; 310/88; 310/239; 310/242; 174/23 R
[58] Field of Search ............... 310/248, 249, 239, 242, 310/245, 247, 42, 71, 88; 439/13, 28, 29; 174/23 R

[56] References Cited

U.S. PATENT DOCUMENTS

| 4,538,085 | 8/1985 | Tanaka | 310/239 |
| 4,626,724 | 12/1986 | Morishita et al. | 310/88 |
| 4,754,184 | 6/1988 | Morikane et al. | 310/239 |

FOREIGN PATENT DOCUMENTS

| 0023774 | 2/1980 | Japan | 310/239 |
| 150355 | 10/1983 | Japan . | |
| 0084584 | 3/1984 | Japan | 310/249 |
| 0089552 | 5/1984 | Japan | 310/249 |
| 0073372 | 5/1985 | Japan . | |
| 160058 | 10/1988 | Japan . | |
| 174183 | 11/1988 | Japan . | |

Primary Examiner—R. Skudy
Attorney, Agent, or Firm—Sughrue, Mion, Zinn, Macpeak and Seas

[57] ABSTRACT

A brush device for a motor comprises two elongated lead wires 10a, 10b, a brush 2a connected to one end of each lead wire, and a terminal 6 connecting the other ends of the lead wires together. The wires are ultrasonically welded together at an intermediate position to form a reduced cross-section portion 11, which is sealingly surrounded by a rubber grommet 7.

2 Claims, 3 Drawing Sheets

BRUSH DEVICE FOR A MOTOR

BACKGROUND OF THE INVENTION

1. Field of the Invention

The present invention relates to a brush device for a motor such as a starter motor.

2. Discussion of Background

FIGS. 4 and 5 show a conventional brush holding device and its brush device used for a typical starter motor. In FIGS. 4 and 5, a reference numeral 1 designates a commutator for the starter motor, numerals 2a, 2b designate respectively positive side brushes and negative side brushes which are respectively held by holders so that they are urged toward the commutator 1 by means of respective brush springs 4 whereby an end of the respective brushes is in slide-contact with the commutator 1, and numeral 5 designates a pigtail for the positive side brushes 2a. The pigtail 5 is formed by firmly connecting an end of each of lead wires 5a connected to the brushes 2a and an end of lead wire 5b having the other end connected to a metallic terminal 6 at a firmly attached portion 5c. A numeral 7 designates a grommet made of rubber which is fitted to the lead wire 5b (FIG. 5). The grommet is fitted to the machine frame of the starter motor (not shown) to thereby prevent water and dust from entering in the starter motor through the pigtail portion. Numeral 8 designates lead wires for the negative side brushes 2b, which are connected to a base plate 9 of a metallic material to which the holders 3 are attached.

In the conventional brush device for a motor having the above-mentioned construction, the pigtail 5 is formed by firmly connecting the three lead wires 5a, 5b at portion 5c by welding or another suitable method. Accordingly, the operation for connecting is troublesome. Further, there is a problem that reliability to the connected portion is low since the three lead wires 5a, 5b are connected in one piece. There is another problem that when the lead wire 5b gets wet, water is apt to enter into the starter motor by the action of capillary tube because the lead wires 5a, 5b are generally made of twisted wires or woven wires. Further, since the grommet 7 is simply fitted to the lead wire 5b, the position of the grommet 7 on the lead wire 5b cannot be fixed. In particular, it is difficult to confirm a suitable position of the grommet 7 on the lead wire 5b after the brush device has been assembled in the starter motor.

SUMMARY OF THE INVENTION

It is an object of the present invention to provide a brush device for a motor of highly reliability and having a waterproofing function.

The foregoing and other objects of the present invention have been attained by providing a brush device for a motor which comprises two elongated lead wires, a brush connected to one end of each lead wire, and a terminal connecting other ends of the lead wires together wherein a predetermined portion of each of the two elongated lead wires is firmly attached to each other and a gromment is disposed at the firmly attached portion of the lead wires.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
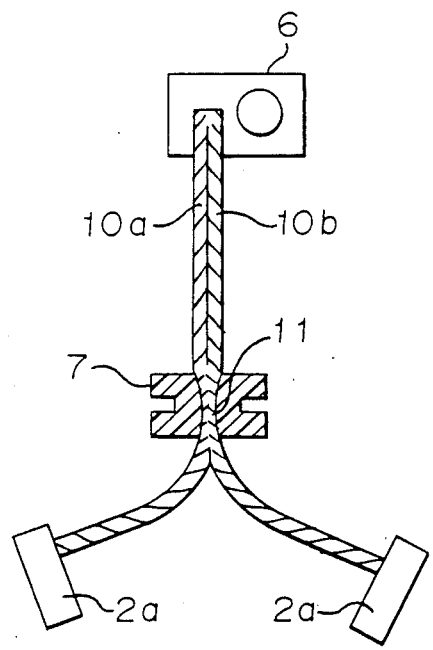
FIG. 1 is a schematic view showing a construction of an embodiment of the brush device for a motor according to the present invention.

Referring to the drawings, wherein the same reference numerals designate the same or corresponding parts throughout the several views, and more particularly to FIG. 1 thereof, there is shown a schematic view of a typical example of the brush device of the present invention. In FIG. 1, numerals 10a and 10b designate respectively elongated multi-strand, juxtaposed lead wires, each having one end connected to a positive side brush 2a and the other, opposite end connected with a single terminal 6 together. A numeral designates a firmly connected portion or one piece waist segment of the two lead wires 10a, 10b formed at an intermediate portion of them. They are firmly attached to each other in one piece by means of ultrasonic welding. The cross-sectional area of the firmly attached portion is smaller than the total cross-sectional area of the wires at other positions. The firmly attached portion 11 provides a fitting position for the rubber grommet 7.

Figure 2:
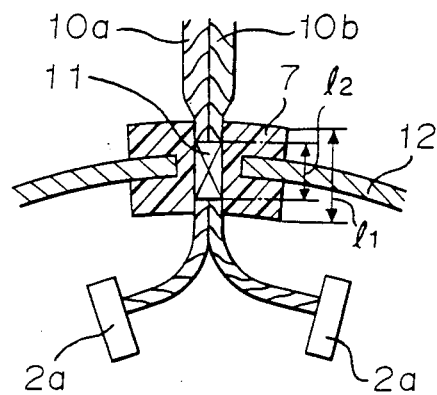
FIG. 2 is a diagram showing a relation of a grommet to a firmly connected portion of the brush device as shown in FIG. 1.

The length $l_2$ of the firmly attached portion 11 is smaller than the length $l_2$ of the grommet 7 fitted to the firmly attached portion 11 as shown in FIG. 2, and the grommet 7 is fitted to the firmly attached portion 11 so as to cover it. In FIG. 2, a numeral 12 designates a rear bracket as the machine frame of the starter motor.

In the brush device for a motor having the construction as described above, since a pigtail is formed by the lead wires 10a, 10b as two elongated wires, the brush 2a and the terminal 6 are connected to a single continuously formed lead wire 10a or 10b, whereby reliability in connecting the brush to the terminal can be increased. Further, the production of the brush device is easy since it is unnecessary to connect the ends of three lead wires as was required in the conventional brush device.

The two lead wires 10a, 10b are firmly attached to each other to form a one-piece body at the firmly attached portion 11 and the grommet 7 is fitted to that portion. Accordingly, it is possible to prevent water from entering to the side of the brushes 2a even when the outer terminal end of the lead wires 10a, 10b with respect to the grommet 7 gets wet. In other words, since the lead wires 10a, 10b are firmly attached to each other at the firmly attached portion 11 by the ultrasonic welding, capillary action in the twisted or woven lead wires or wire strands is prevented at the firmly attached portion 11 to thereby block the entering of water from the terminal side and prevent any movement of the grommet along the lead lines. Further, since the firmly attached portion 11 has a smaller cross section from that of the other portions, the position of the grommet 7 is readily established.

Further, since the firmly attached portion 11 is covered or surrounded by the grommet 7, a stress of bending applied to the lead wires 10a, 10b due to vibrations can be absorbed by the rubber grommet 7 and no stress is concentrated at the firmly attached portion 11, whereby the breaking of the wire at the firmly attached portion 11 can be prevented.

Figure 3:
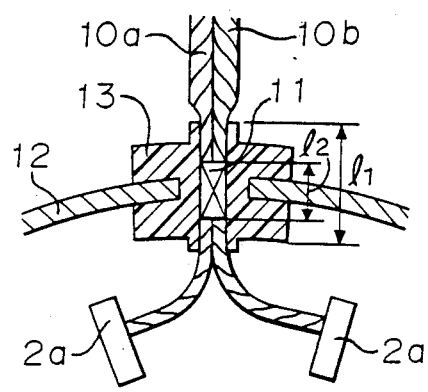
FIG. 3 is a diagram showing another embodiment of the brush device for a motor according to the present invention.
Figure 4:
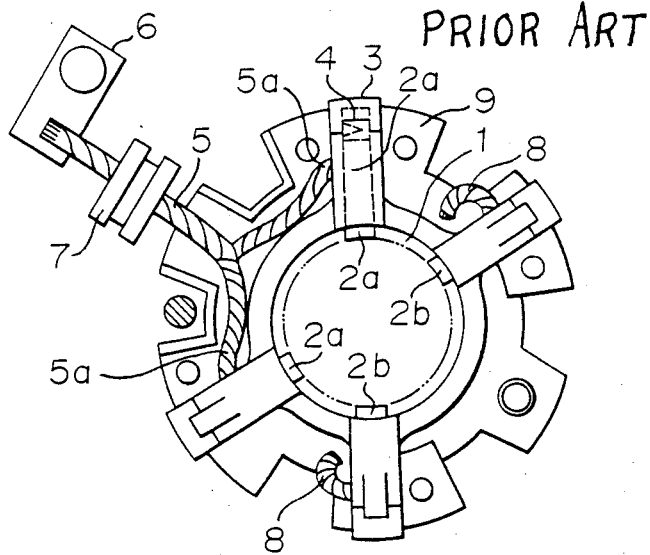
FIG. 4 is a diagram of a brush holding device in which a conventional brush device for a motor is applied.
Figure 5:
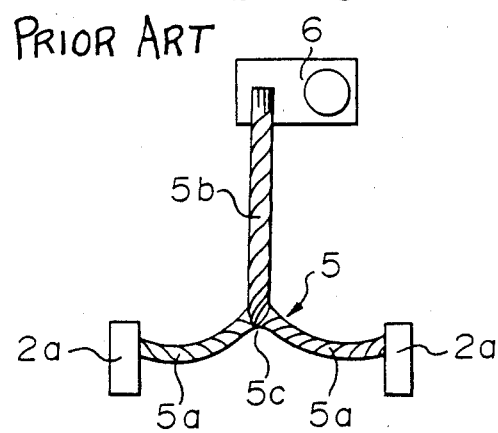
FIG. 5 is a diagram showing the conventional brush device as shown in FIG. 4.

FIG. 3 shows a grommet 13 which is formed to have a relation of $l_1 > l_2$ by elongating both end portions along the axial line of the lead wires 10a, 10b. In this case, the same function as the above mentioned embodiment of the grommet 7 can be obtained.

In the above-mentioned embodiment, the firmly attached portion 11 is formed by the ultrasonic welding of the lead wires 10a, 10b. However, the firmly attached portion 11 may be formed by another suitable method such as brazing.

Thus, in accordance with the present invention, predetermined portions of two lead wires are firmly attached to each other and a grommet is fitted to the firmly attached portion. Accordingly, it is easy to manufacture the brush device for a motor and the reliability of the brush device can be increased.

Obviously, numerous modifications and variations of the present invention are possible in light of the above teachings. It is therefore to be understood that within the scope of the appended claims, the invention may be practiced otherwise than as specifically described herein.

What is claimed is:

1. A brush device for a motor, comprising: two elongated, multi-strand lead wires (10a,10b), a brush (2a) connected to one end of each lead wire, a terminal (6) connecting another, opposite end of each lead wire together, a predetermined portion of each of said two elongated multi-strand lead wires being juxtaposed and firmly attached together at an intermediate position to form a one-piece waist segment having a cross-sectional area smaller than that of said two elongated multi-strand lead wires at unattached positions and a rubber grommet having an axial length greater than that of said segment sealingly disposed surrounding said segment, a smaller cross-sectional area of said segment serving to fixedly locate the grommet and prevent any movement thereof along the lead wires, and serving to prevent any water entry from a terminal side by capillary action along the lead wires.

2. The brush device for a motor according to claim 1, wherein said one-piece waist segment is formed by ultrasonic welding.

* * * * *